US008869061B1

(12) United States Patent
Bendig

(10) Patent No.: US 8,869,061 B1
(45) Date of Patent: Oct. 21, 2014

(54) USER INTERFACE FOR SEARCHING AN ELECTRONIC DOCUMENT

(75) Inventor: Krista Bendig, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 3079 days.

(21) Appl. No.: 10/652,766

(22) Filed: Aug. 29, 2003

(51) Int. Cl.
*G06F 3/048* (2006.01)

(52) U.S. Cl.
USPC ........... 715/780; 715/763; 715/764; 715/817; 715/818; 715/819; 715/820; 715/853; 707/999.004; 707/999.005; 707/999.201

(58) Field of Classification Search
USPC ......... 715/779–783, 763–764, 817–820, 853; 707/999.004, 999.005, 999.201
See application file for complete search history.

(56) References Cited

U.S. PATENT DOCUMENTS

| 5,305,435 | A | | 4/1994 | Bronson | 715/777 |
| 5,532,715 | A | | 7/1996 | Bates et al. | 345/384 |
| 5,542,040 | A | | 7/1996 | Chang et al. | 715/778 |
| 5,544,360 | A | | 8/1996 | Lewack et al. | 707/1 |
| 5,649,193 | A | | 7/1997 | Sumita et al. | 707/103 R |
| 5,710,844 | A | * | 1/1998 | Capps et al. | 382/317 |
| 5,745,899 | A | | 4/1998 | Burrows | 707/102 |
| 5,757,904 | A | | 5/1998 | Anderson | |
| 6,006,221 | A | | 12/1999 | Liddy et al. | |
| 6,014,662 | A | | 1/2000 | Moran et al. | 707/3 |
| 6,014,665 | A | | 1/2000 | Culliss | 707/5 |
| 6,070,157 | A | | 5/2000 | Jacobson et al. | 707/1 |
| 6,175,830 | B1 | | 1/2001 | Maynard | 707/5 |
| 6,247,010 | B1 | * | 6/2001 | Doi et al. | 1/1 |
| 6,301,586 | B1 | | 10/2001 | Yang et al. | 707/104.1 |
| 6,338,058 | B1 | | 1/2002 | Jacobson et al. | 707/3 |
| 6,370,533 | B1 | | 4/2002 | Sato et al. | 707/10 |
| 6,393,460 | B1 | | 5/2002 | Gruen et al. | |
| 6,460,029 | B1 | | 10/2002 | Fries et al. | 707/3 |
| 6,484,166 | B1 | | 11/2002 | Maynard | 707/5 |
| 6,571,234 | B1 | | 5/2003 | Knight | 70/3 |
| 6,571,236 | B1 | | 5/2003 | Ruppelt | |
| 6,578,022 | B1 | | 6/2003 | Foulger et al. | 6/45 |
| 6,636,853 | B1 | * | 10/2003 | Stephens, Jr. | 1/1 |
| 6,654,758 | B1 | | 11/2003 | Teague | |
| 6,671,683 | B2 | | 12/2003 | Kanno | 707/5 |
| 6,741,268 | B1 | | 5/2004 | Hayakawa | |

(Continued)

OTHER PUBLICATIONS

Kathatina Siorpaes, STI; Search and Navigation Tools; 2009; 24 pages.*

(Continued)

*Primary Examiner* — Linh K Pham
(74) *Attorney, Agent, or Firm* — Jessica Meyers; Jim Ross; Micky Minhas

(57) ABSTRACT

A graphical user interface (GUI) capable of presenting a display that indicates that navigation controls can be used for navigating through results of a search using a search engine. The GUI highlights the GUI control that accepts text characters for indicating a search term such that the area contrasts with the display of an adjacent display area in response to entering the search term. Once the search is initiated, such as by actuating a search initiation control, the GUI may change to highlight navigation controls to indicate that those controls can be used to navigate between search result hits. Additional icons or controls may be displayed to further indicate the function of navigation controls and actions that may be taken to further modify the display of controls, such as collapsing some of the controls.

15 Claims, 10 Drawing Sheets

(56) References Cited

U.S. PATENT DOCUMENTS

| | | | |
|---|---|---|---|
| 6,801,909 B2 | 10/2004 | Delgado et al. | |
| 6,828,990 B2 | 12/2004 | Krolczyk et al. | |
| 6,839,702 B1 | 1/2005 | Patel et al. | 707/3 |
| 6,845,484 B1 | 1/2005 | Kraft et al. | 715/514 |
| 6,947,930 B2 | 9/2005 | Anick et al. | 707/5 |
| 7,062,483 B2 | 6/2006 | Ferrari et al. | |
| 7,113,943 B2 | 9/2006 | Bradford et al. | |
| 7,143,348 B1 | 11/2006 | Krause | |
| 7,162,686 B2 * | 1/2007 | Blazejewski et al. | 715/206 |
| 7,296,016 B1 | 11/2007 | Farach-Colton et al. | |
| 7,555,476 B2 * | 6/2009 | Holbrook | 1/1 |
| 8,234,245 B2 * | 7/2012 | Arrouye et al. | 707/625 |
| 2001/0007987 A1 | 7/2001 | Igata | |
| 2001/0049706 A1 | 12/2001 | Thorne | |
| 2002/0016787 A1 | 2/2002 | Kanno | 707/5 |
| 2002/0040311 A1 | 4/2002 | Douglass et al. | 705/7 |
| 2002/0059270 A1 | 5/2002 | Schlabach et al. | 707/100 |
| 2002/0059395 A1 | 5/2002 | Liou | |
| 2002/0059425 A1 | 5/2002 | Belfiore et al. | 709/226 |
| 2002/0069223 A1 | 6/2002 | Goodisman et al. | 707/513 |
| 2002/0080180 A1 | 6/2002 | Mander et al. | 345/769 |
| 2002/0089533 A1 | 7/2002 | Hollaar et al. | |
| 2002/0091698 A1 | 7/2002 | Young et al. | 707/10 |
| 2002/0103789 A1 | 8/2002 | Turnbull et al. | 707/3 |
| 2002/0143828 A1 | 10/2002 | Montero et al. | 707/533 |
| 2002/0143940 A1 | 10/2002 | Chi et al. | 709/225 |
| 2002/0152222 A1 * | 10/2002 | Holbrook | 707/104.1 |
| 2002/0167538 A1 | 11/2002 | Bhetanabhotla | |
| 2002/0174202 A1 | 11/2002 | Kohyama et al. | 709/220 |
| 2002/0198884 A1 | 12/2002 | Eisinger | 707/10 |
| 2003/0014398 A1 | 1/2003 | Ohta et al. | 707/3 |
| 2003/0076352 A1 | 4/2003 | Uhlig et al. | |
| 2003/0101047 A1 | 5/2003 | Panttaja | |
| 2003/0144996 A1 * | 7/2003 | Moore, Jr. | 707/3 |
| 2003/0212673 A1 | 11/2003 | Kadayam et al. | 707/3 |
| 2003/0217047 A1 | 11/2003 | Marchisio | |
| 2003/0233419 A1 | 12/2003 | Beringer | 709/206 |
| 2004/0024790 A1 | 2/2004 | Everett | 707/200 |
| 2004/0059996 A1 | 3/2004 | Fasciano | 715/500.1 |
| 2004/0143564 A1 | 7/2004 | Gross et al. | 707/1 |
| 2004/0153306 A1 | 8/2004 | Tanner et al. | |
| 2004/0168133 A1 | 8/2004 | Wynn et al. | 715/541 |
| 2004/0236801 A1 | 11/2004 | Borden et al. | 707/204 |
| 2004/0243941 A1 | 12/2004 | Fish | |
| 2004/0266414 A1 | 12/2004 | Likwornik | |
| 2005/0015366 A1 | 1/2005 | Carrasco et al. | 707/3 |
| 2005/0015726 A1 | 1/2005 | Tuominen | 715/733 |
| 2005/0071150 A1 | 3/2005 | Nasypny | 704/9 |
| 2005/0192953 A1 | 9/2005 | Neale et al. | 707/4 |
| 2009/0006543 A1 * | 1/2009 | Smit | 709/203 |

OTHER PUBLICATIONS

Norstan Consulting; Department of Human Services Office of Policy Analysis Web Site; Dec. 1999; 24 pages.*

Hascoet; Interaction and Visualization Supporting Web Browsing Patterns; © 2001; IEEE; 6 pages.*

U.S. Appl. No. 10/675,702, filed Sep. 30, 2003, entitled "Method for Context Searching of Electronic Data".

U.S. Appl. No. 10/674,753, filed Sep. 30, 2003, entitled "System and Method for Suggesting a Scope for Searching Electronic Data".

U.S. Appl. No. 10/675,838, filed Sep. 30, 2003, entitled "Method for Extracting Information Associated with a Search Term".

U.S. Appl. No. 10/675,701, filed Sep. 30, 2003, entitled "System and Method for Simultaneously Presenting Topical and Granular Search Results of Electronic Data".

U.S. Appl. No. 10/674,762, filed Sep. 30, 2003, entitled "Method for Visually Enhancing Search Results of Electronic Data".

Angelo, Mike, "Mozilla 0.9.9 Browser-Sute Milestone Released Behind Schedule", MozillaQuest Magazine, Mar. 11, 2002, 13 pp.

Byrd, Donald, "A Scrollbar-Based Visualization for Document Navigation", ACM, 1999, pp. 122-129.

"Circus Ponies NoteBook 1.1 Ships on the Mac OS X with Over 30 New Features and Enhancements", Market Wire, Jun. 2003, 4 pp.

U.S. Official Action mailed Mar. 7, 2006 in U.S. Appl. No. 10/675,838.

U.S. Official Action mailed Mar. 21, 2006 in U.S. Appl. No. 10/674,753.

U.S. Official Action mailed Apr. 7, 2006 in U.S. Appl. No. 10/675,701.

U.S. Official Action mailed Apr. 20, 2006 in U.S. Appl. No. 10/675,702.

U.S. Official Action mailed Jul. 18, 2006 in U.S. Appl. No. 10/674,762.

U.S. Final Official Action mailed Oct. 13, 2006 in U.S. Appl. No. 10/674,753.

U.S. Final Official Action mailed Nov. 29, 2006 in U.S. Appl. No. 10/675,838.

U.S. Final Official Action mailed Dec. 27, 2006 in U.S. Appl. No. 10/675,702.

U.S. Final Official Action mailed Jan. 18, 2007 in U.S. Appl. No. 10/675,701.

U.S. Final Official Action mailed Feb. 14, 2007 in U.S. Appl. No. 10/674,762.

U.S. Official Action mailed Oct. 14, 2008 in U.S. Appl. No. 10/675,701.

U.S. Official Action mailed Nov. 25, 2008 in U.S. Appl. No. 10/674,753.

U.S. Official Action mailed Dec. 4, 2008 in U.S. Appl. No. 10/675,838.

U.S. Official Action mailed Dec. 31, 2008 in U.S. Appl. No. 10/675,702.

U.S. Official Action mailed Mar. 20, 2009 in U.S. Appl. No. 10/675,701.

Office Action regarding U.S. Appl. No. 10/675,838 dated Jul. 26, 2007.

U.S. Official Action mailed May 29, 2007 in U.S. Appl. No. 10/674,753.

U.S. Official Action mailed Jul. 10, 2007 in U.S. Appl. No. 10/675,701.

U.S. Official Action mailed Aug. 24, 2007 in U.S. Appl. No. 10/675,702.

U.S. Official Action mailed Oct. 10, 2007 in U.S. Appl. No. 10/674,762 29 pp.

U.S. Official Action mailed Feb. 8, 2008 in U.S. Appl. No. 10/674,753 25 pp.

U.S. Official Action mailed Jun. 25, 2008 in U.S. Appl. No. 10/675,838 16 pp.

U.S. Official Action mailed Jul. 2, 2008 in U.S. Appl. No. 10/675,702 29 pp.

U.S. Official Action mailed Jul. 21, 2008 in U.S. Appl. No. 10/674,762 29 pp.

U.S. Official Action mailed Apr. 16, 2008 in U.S. Appl. No. 10/675,701 32 pp.

U.S. Official Action mailed Apr. 24, 2009 in U.S. Appl. No. 10/674,753, pp. 1-26.

U.S. Official Action mailed Jun. 22, 2009 in U.S. Appl. No. 10/675,702, pp. 1-35.

U.S. Official Action mailed Aug. 27, 2009 in U.S. Appl. No. 10/675,701, pp. 1-36.

U.S. Official Action mailed Dec. 16, 2009 in U.S. Appl. No. 10/674,701, pp. 1-33.

* cited by examiner

USER INTERFACE FOR SEARCHING AN ELECTRONIC DOCUMENT

FIELD OF THE INVENTION

The present invention relates to providing a user interface for searching an electronic document and specifically to a user interface that provides an indication that navigation controls for an electronic document editor can be used to navigate through search results.

BACKGROUND OF THE INVENTION

Electronic document editors are widely used in homes and businesses today. Familiar examples of these editors include word processing applications that operate on personal computers (PCs) and note-taking applications that operate on personal data assistants (PDAs). These applications strive to replace paper as the simplest means to record and communicate information. Computer technology provides these applications with advantages over paper, including the capability to search for a word or phrase over a large number of electronic pages of content in a very short period of time and the ability to change format and content of an electronic document at the click of a button.

Electronic document editors may display images and receive commands through a graphical user interface (GUI). A GUI may include a display screen. An electronic document editor may display, along with the content of an electronic document, controls that enable a user to input information into the electronic document or navigate from one point in the document to another. A user may actuate these controls by using a pointing device, such as a mouse or stylus. A common example of such controls is a toolbar with buttons that can be actuated by a user to affect document formatting and style or initiate a macro or another software program.

In developing electronic document editors, a balance must be struck between user-accessible controls shown to a user by a GUI and the overall functionality of the displayed images. A GUI with too few controls may require a user to perform additional steps to input information to the editor, such as using a drop-down menu as compared to a control visible on the GUI display. A GUI with too many controls may result in a smaller viewable image of text and pictures contained in an electronic document or may crowd controls in one location of the display, which may limit the aesthetic or ergonomic quality of the display. This balance could be acutely important for a free-form document editor, which may reside on computer hardware that is designed to be small and portable so as to emulate a traditional notebook of paper. A GUI that could use the same controls for multiple purposes yet be able to readily communicate to a user what function will be performed by actuating the control would help to maximize the usefulness of an electronic document display.

One specific capability that an electronic document editor may have is to allow a user to search for a specific word or phrase in an electronic document through a search routine, in other words, a function of the electronic document editor that enables a user to find the specific word or phrase among the entire content within one or more electronic documents. The editor may display occurrences of the searched word or phrase, also referred to as hits, through a GUI in a manner that distinguishes the word or phrase from surrounding words and phrases. For example, the GUI can highlight the specific occurrences of the searched word or phrase in the electronic document in a color different from the background color of the electronic document display. The electronic document editor may allow the user to navigate through the document to each preceding or successive hit. This navigation may be accomplished by pressing one or more keys on a keyboard or by actuating a control displayed by the GUI using a pointing device. To perform a search, a typical word processor program may open a separate window in response to a user command and this separate window may be capable of accepting the search word or phrase, also referred to as a search term, and have other controls that affect the conduct of the search. This window may have controls that allow the user to navigate to hits of the word or phrase throughout the document.

Some word processing programs have controls on the GUI with multiple functions. For example, WORD, a word processing program developed by Microsoft Corporation, Redmond, Wash., uses arrow-like controls that allow a user to move from one page to the next in an electronic document. After a user performs a search, for example by entering a search term into a box that accepts text characters and actuating a search initiation control, the arrow-like controls may enable a user to move to successive hits of that search term. This navigation capability may occur even after a user has closed a separate GUI available for conducting a search, such as a search window. The arrow-like controls may change color to indicate a change in function. One deficiency with this type of multiple-function control is that it is not associated by the GUI with the specific function. In the example of the WORD program, the arrow-like controls are not located near other search controls or otherwise connected by the GUI to the search controls such that the GUI communicates an association with the navigation controls and the search function.

What is needed is a GUI capable of displaying multi-function navigation controls and associating the function of the controls with the basis for the navigation, such as navigating between preceding or successive hits following initiating a search routine in an electronic document.

SUMMARY OF THE INVENTION

The present invention provides a graphical user interface (GUI) capable of changing its display to indicate that navigation controls can be used for navigating through results of a search conducted in the electronic document. The navigation controls are typically used to cause a GUI to display another portion of content of an electronic document, such as to the next page. A GUI may highlight the control that accepts text characters for indicating a search term such that the area contrasts with the display of an adjacent display area in response to entering a search term. Once the search is initiated, such as by actuating a search initiation control, the GUI may change to highlight navigation controls located adjacent to the search controls to indicate that those controls can be used to navigate between search result hits. Additional icons or controls may be displayed to further indicate the function of navigation controls and actions that may be taken to further modify the display of controls, such as collapsing some of the controls.

In one aspect of the present invention, a computer-implemented method for changing a first function of one or more navigation controls on the user interface to a second function is provided, wherein each navigation control is located adjacent to one or more search controls. The method comprises the steps of (1) changing a display image of the search controls on a user interface display in response to receiving a search term into a search term location of an electronic document editor; (2) assigning the second function to the navigation controls while simultaneously discontinuing the first function of the navigation controls; and (3) changing a display image of the navigation controls on the user interface in response to the assigning of the second function to the navigation controls. The display image of the navigation controls is changed in the same way as the change of the display image of the search controls.

In another aspect, a computer-implemented method for changing the display of one or more navigation controls on a user interface of an electronic document editor is provided. The method comprises the steps of (1) changing a display image of one or more search controls on a user interface display in response to receiving a search term into a search term location of an electronic document editor; and (2) changing a display image of the navigation controls on the user interface in response to conducting a search of the search term in the electronic document editor. The display image of the navigation controls are displayed on the user interface adjacent to the display image of the search controls and the display image of the navigation controls is changed in the same way as the change of the display image of the search controls The aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention support a graphical user interface (GUI) of an electronic document editor to display multi-function navigation controls and associate the function of the controls with the basis for the navigation, such as navigating between preceding or successive hits following a search of an electronic document.

Figure 1:
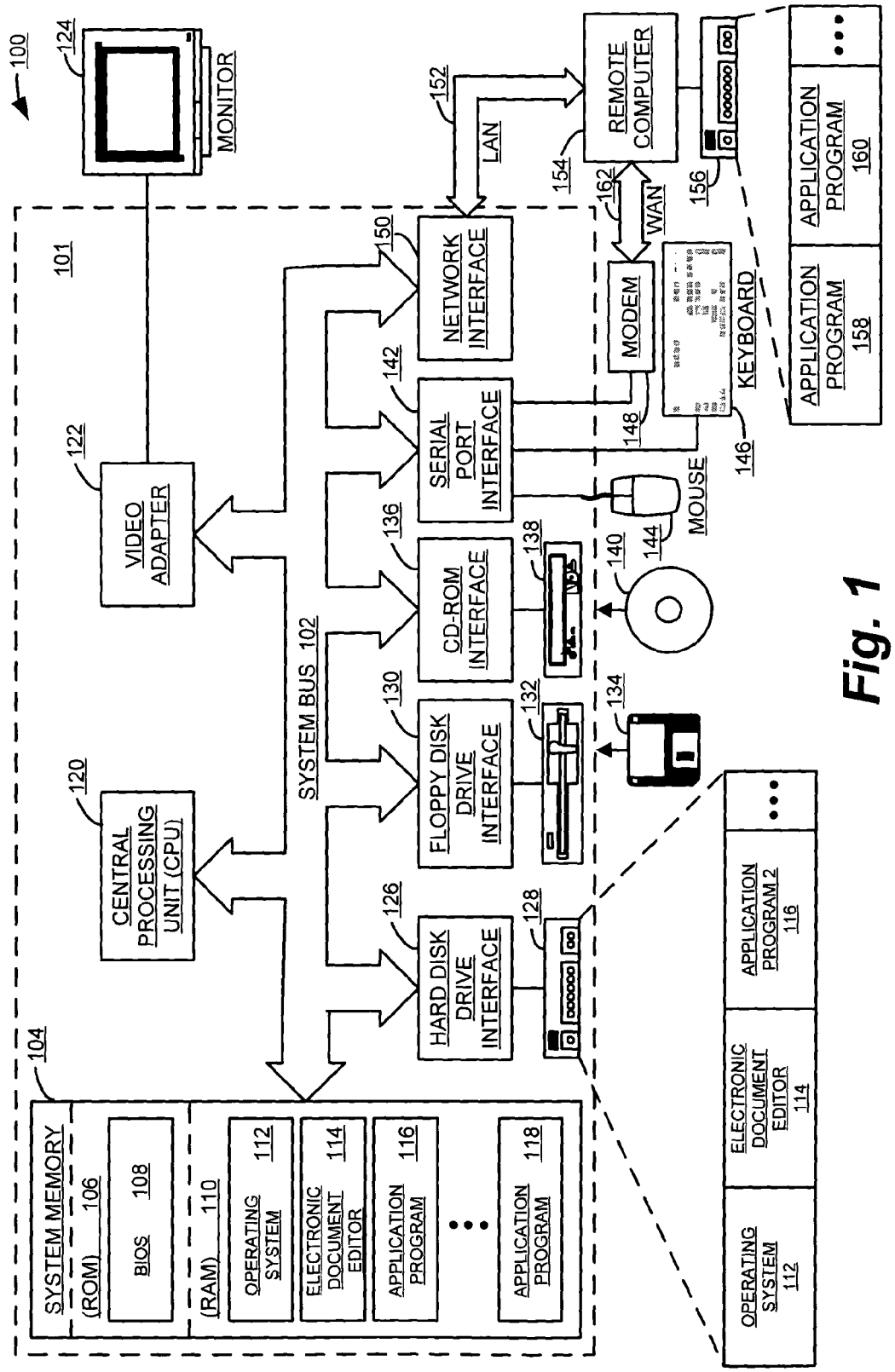
FIG. 1 is a block diagram illustrating a representative operating environment for an exemplary embodiment of the present invention.

FIG. 1 illustrates a representative operating environment 100 for an exemplary embodiment of the present invention. This representative operating environment includes a general-purpose computing device in the form of a conventional personal computer 101. Generally, the personal computer 101 includes a processing unit 120, a system memory 104, and a system bus 102 that couples system components including the system memory 104 to the processing unit 120. The system bus 102 may be any of several types of bus structures including a memory bus or memory controller, a peripheral bus, and a local bus using any bus architecture. The system memory includes a read-only memory (ROM) 106 and a random access memory (RAM) 110. A basic input/output system (BIOS) 108, containing the basic routines that help to transfer information between elements within personal computer 101, such as during start-up, is stored in ROM 106.

Personal computer 101 further includes a hard disk drive 128, a floppy disk drive 132 for reading from or writing to a removable magnetic disk 134, and an optical disk drive 138 for reading from or writing to a removable optical disk 140 such as a CD-ROM or other optical media. Hard disk drive 128, magnetic disk drive 132, and optical disk drive 138 are connected to system bus 102 by a hard disk drive interface 120, a floppy disk drive interface 130, and a CD-ROM disk drive interface 136, respectively. Although the exemplary environment described herein employs hard disk 128, removable magnetic disk 134, and removable optical disk 140, it should be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the exemplary operating environment. The drives and their associated computer-readable media provide nonvolatile storage of computer-executable instructions, data structures, program modules, and other data for personal computer 101.

A number of program modules may be stored on hard disk 128, magnetic disk 134, optical disk 140, ROM 106, or RAM 110, including an operating system 112, an electronic document editor 114, and multiple application programs 116-118. A representative embodiment of a document editor is disclosed in more detail below in connection with FIG. 2. Program modules typically include routines, sub-routines, programs, objects, components, data structures, etc., that perform particular tasks or implement particular abstract data types.

A user may enter commands and information into personal computer 101 through input devices, such as a keyboard 146 and a pointing device, such as mouse 144. Pointing devices may also include a trackball (not shown) and an electronic pen or stylus (not shown) that can be used in conjunction with an electronic tablet or a typical display screen. Other input devices (all not shown) may include a microphone, joystick, game pad, satellite dish, scanner, or the like. These and other input devices are often connected to processing unit 120 through a serial port interface 142 that is coupled to the system bus 102, but may be connected by other interfaces, such as a parallel port, game port, a universal serial bus (USB), or the like. A display device, such as monitor 124, may also be connected to system bus 102 via an interface, such as a video adapter 122. The monitor 124 may display images generated by an application program, such as an electronic document editor 114, and comprise a GUI by which a user can input information to the application program and the application program can communicate information to a user. In addition to the monitor 124, personal computers typically include other peripheral output devices (not shown), such as speakers and printers.

The personal computer 101 may operate in a networked environment using logical connections to one or more remote computers 154. Remote computer 154 may be another personal computer, a server, a client, a router, a network PC, a peer device, or other common network node. While a remote computer 154 typically includes many or all of the elements described above relative to the personal computer 101, only a memory storage device 156 has been illustrated in FIG. 1. The memory storage device 156 may include application program 158 and application program 160. The logical connections depicted in FIG. 1 include a local area network (LAN) 152 and a wide area network (WAN) 162. Such networking environments are commonplace in offices, enterprise-wide computer networks, intranets, and the Internet.

When used in a LAN networking environment, the personal computer 101 is often connected to the local area network 152 through a network interface or adapter 150. When used in a WAN networking environment, the personal computer 101 typically includes a modem 148 or other means for establishing communications over WAN 162, such as the Internet. Modem 148, which may be internal or external, is connected to system bus 102 via serial port interface 142. It will be appreciated that the network connections shown are exemplary and other means of establishing a communications link between the computers may be used.

Moreover, those skilled in the art will appreciate that the present invention may be implemented in other computer system configurations, including PDAs, electronic writing tablets, multiprocessor systems, microprocessor-based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
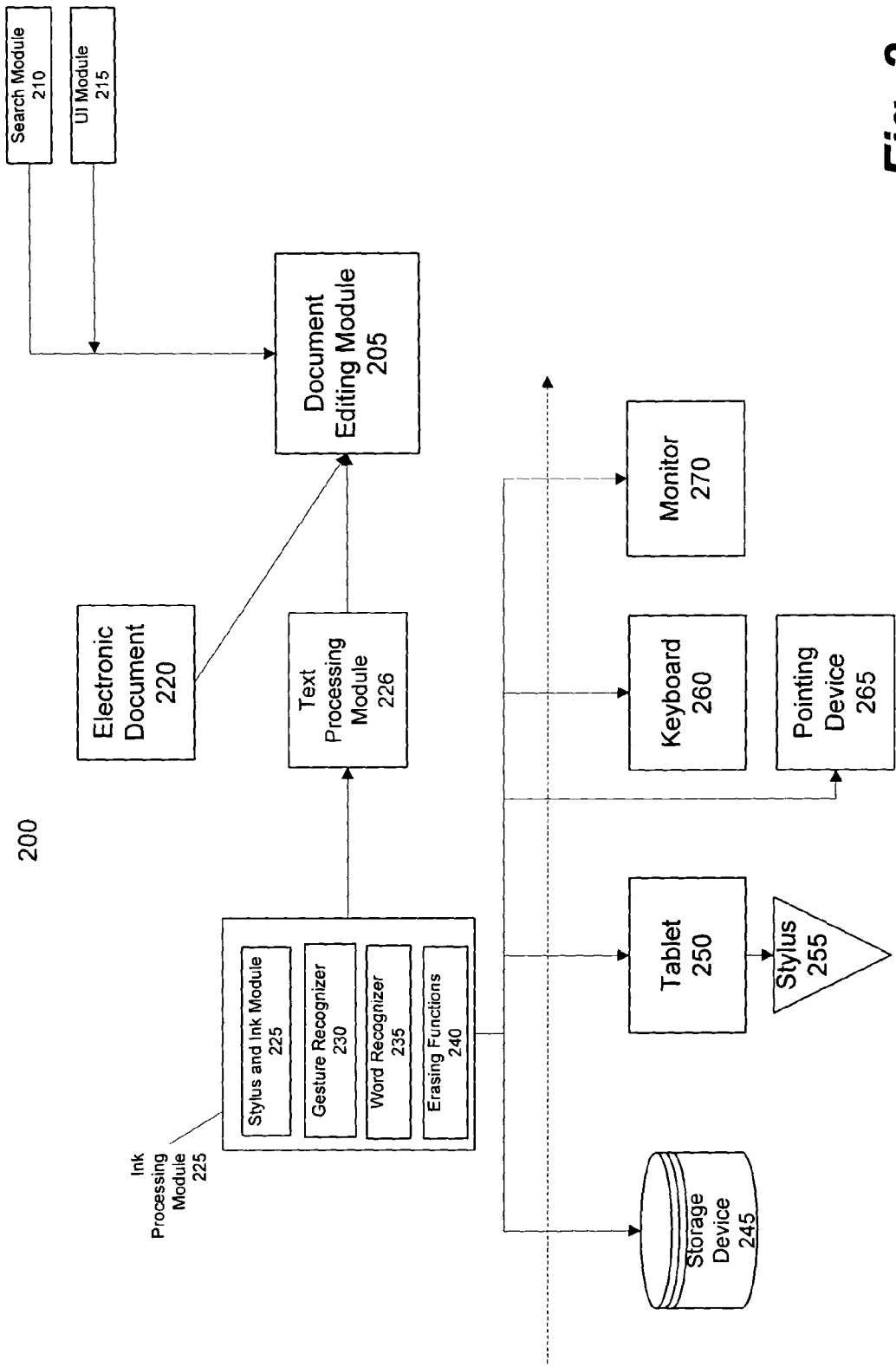
FIG. 2 is a block diagram depicting the primary functional components of an exemplary electronic document editor and related input devices.

FIG. 2 is a block diagram depicting the primary functional components of an exemplary electronic document editor and related input devices for the representative operating environment of an electronic writing tablet, otherwise described as an electronic tablet. Specifically, FIG. 2 depicts an architecture 200 for an electronic writing tablet in the context of an electronic document editor constructed in accordance with an exemplary embodiment of the present invention. Conventional input devices are represented by the keyboard 260 and the pointing device 265 (e.g., mouse, trackball). Other output devices (not shown) can include a printer or speaker. Other hardware components shown in FIG. 2 include an electronic tablet 250 and an accompanying stylus 255. The tablet 250 and stylus 255 are used to input handwriting strokes that can be converted to data, referred to as electronic ink. The electronic ink may be incorporated into an electronic document 220 and may be displayed on either the electronic tablet 250, the monitor 270, or both. Although the electronic tablet 250 and the monitor 270 are illustrated as being distinct, in an exemplary embodiment of the present invention, they can be integrated into a single component. The joint tablet/monitor component has the ability to display information and receive input from the stylus 255. In other words, the joint tablet/monitor component has the ability to provide a GUI for interacting with the document editing module 205.

In the representative architecture 200, an ink-processing module 225 is operable to receive data from the electronic tablet 250 and to render that data as electronic ink. In one embodiment of the present invention, the ink-processing module 225 can be a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink-processing module 225 can also include an erasing functions module 240 for removing electronic ink that has been previously rendered.

Although ink processing modules are known in the art and necessary for an electronic tablet to function, a novel document editing module has been developed by Microsoft Corporation of Redmond, Wash. that capitalizes on the benefits of handwriting processing technology. The module (i.e., document editor) is a free-form document editor that leverages the functionality of electronic handwriting technology to enable more effective and efficient note taking. Specifically, document editing module 205 facilitates manipulating electronic ink so that a user can create and modify an electronic document 220 with greater ease and sophistication. The document editing module 205 typically comprises a collection of software modules for controlling and manipulating electronic ink rendered on the monitor 270.

The exemplary electronic document editor also includes a search module 210 and a UI module 215. A user may want to locate a word or phrase within an electronic document 220. The word or phrase, also referred to herein as a search term, can be inputted to the document editing module 205 by as user, through the keyboard 260, the stylus 255, or other input device. The exemplary search module 210 locates occurrences of the search term, also referred to herein as hits, in response to a user initiating a search. The search module 210 also causes the GUI to distinctly display the hits to a user, such as by highlighting the hits in an electronic document 220 in a way that contrasts with the normal display of the electronic document's 220 content. In the alternative, the search module 210 provides a listing of hits in a separate window where each listed hit may be linked to a location in an electronic document containing that hit.

The exemplary UI module 215 may control the images displayed on the tablet 250 or the monitor 270. The UI module may accept input data from a user to the document editing module 205, such as when a user actuates a control displayed by the UI module 215 with a pointing device 265 or stylus 255. The UI module 215 typically displays a variety of images that can be used to input information to the document editing module 205, such as buttons, menus, drop-down boxes, and boxes that accept text characters.

Exemplary embodiments of the present invention relate most directly to displaying search and navigation controls in an electronic document 220. FIGS. 1 and 2 provide a general overview of the environments in which the inventors contemplate exemplary embodiments of the present invention will be used.

Figure 3:
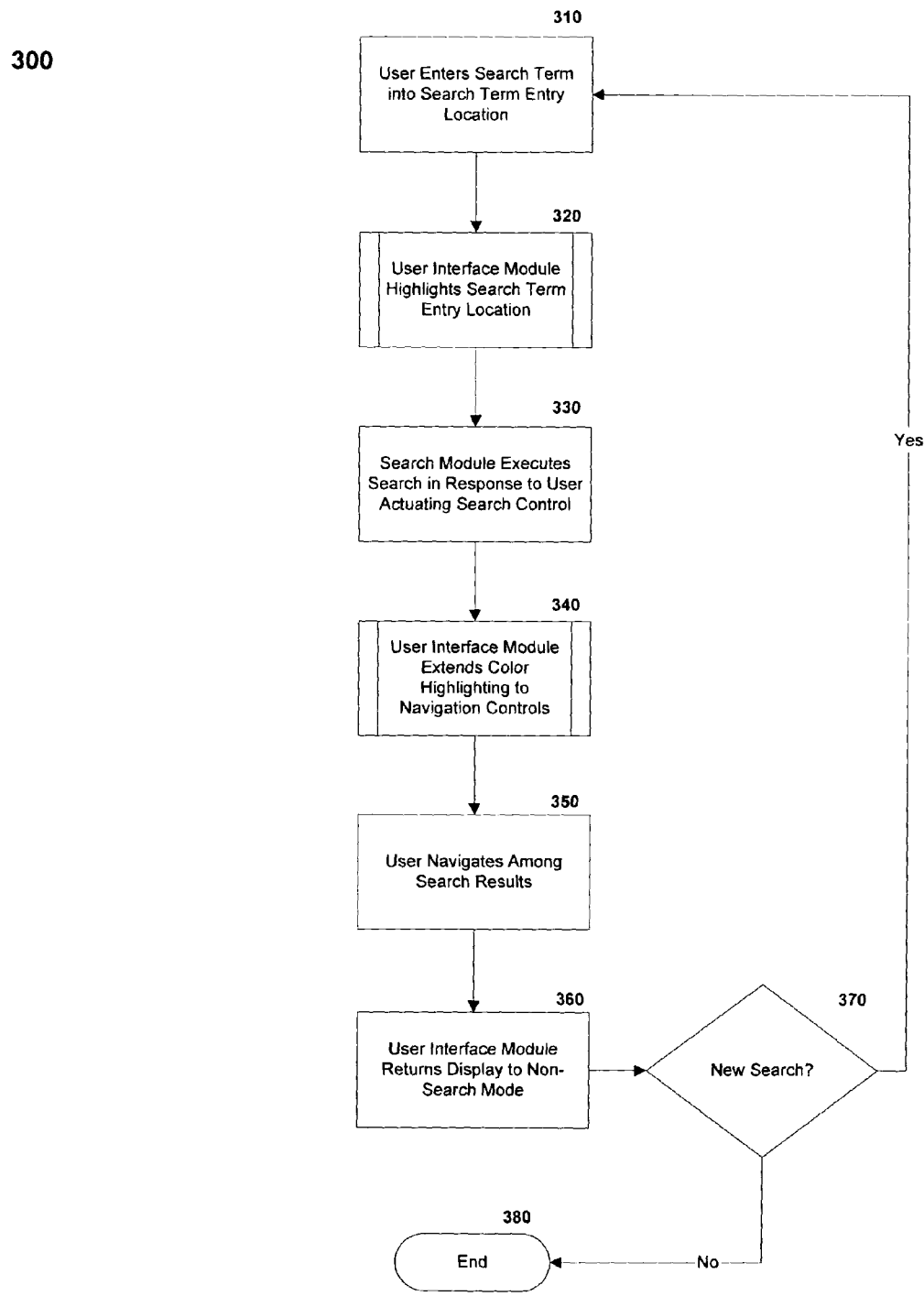
FIG. 3 is a flow diagram presenting a process for a graphical user interface (GUI) to affect a display image to associate navigation controls for an electronic document with a search function in accordance with an exemplary embodiment of the present invention.

FIG. 3 is a flow diagram presenting a process 300 for a UI module 215 to affect a display image to associate navigation controls for an electronic document 220 with a search function in accordance with an exemplary embodiment of the present invention. Referring to FIGS. 2 and 3, at step 310, a user enters a search term into a search term entry location provided by the UI module 215, such as a box that can accept alphanumeric characters. At step 320, the UI module 215 highlights the search term entry location in response to detecting an entry of the search term at step 310. This highlighting may include displaying the background of the search term entry location in a color that contrasts with the background color of the surrounding display area on the GUI. Step 320 is discussed in greater detail below, in conjunction with FIG. 4a.

At step 330, the search module 210 executes a search for the search term entered at step 310 in response to a user actuating a search initiation control. This search initiation control may be a button adjacent to the location for entering the search term. At step 340, the UI module 215 extends highlighting to include navigation controls that may be located adjacent to the location for entering the search term. When a search is not being conducted, these navigation controls, located adjacent to the location for entering the search term, may be used for other operations, such as causing a GUI to display a portion of content in an electronic document 220, typically a preceding or succeeding page. This step 340 is discussed in greater detail below, in conjunction with FIG. 4b.

At step 350, the UI module 215 alters the function of navigation controls, enabling a user to navigate between successive hits, using the navigation controls that have been highlighted in step 340. The UI module 215 converts existing navigation controls to controls that will navigate among hits resulting from the search executed at step 330. In other words, instead of causing a GUI to display a preceding or succeeding page of content in an electronic document 220 or some other function that is performed by the navigation controls when a search is not being conducted, the UI module 215 assigns a function to these navigation controls that correspond to, for example, moving to preceding or successive hits that resulted from conducting a search. The UI module 215 can convert the function of the navigation control in parallel with step 340. As the appearance of the controls are changed, such as by highlighting the controls with a contrasting background, the function of the controls may change.

In response to the user's action at step 350, the document editing module 205 may display, through the GUI, a portion of an electronic document 220 that contains a search result hit. The navigation controls highlighted at step 340 may include controls that enable a user to select the direction to move in the electronic document 220 to find the next hit relative to the insertion point, such as having two arrows, one for moving toward the end of the electronic document 220 and one for moving toward the beginning of the electronic document 220. This hit may be the first hit encountered when moving in the document a direction corresponding to a navigation control relative to the location of the insertion point in the electronic document 220.

At step 360, the process 300 returns the GUI to its configuration when not conducting a search, in other words, the UI module 215 reverses the steps for processes 320 and 340 and step 350. Step 360 may be initiated by a user placing an insertion point (IP) into the content of the electronic document 220. At step 370, the process 300 determines if a new search is to be conducted, that is, if a different search term is to be located in the electronic document. This decision may be based on whether a user has entered a new word or phrase at the search term location. If a new search is to be conducted, the process 300 returns to step 310. Otherwise, the process 300 ends at step 380.

The process 300 differs from the prior art in that the search controls and normal navigation controls, that is, controls that enable a user to cause a GUI to display a preceding or succeeding page of content of an electronic document or similar navigation, are located adjacent to one another on the GUI display. As such, the UI module 215 can change the display of the GUI to visually or otherwise indicate that, when a search is initiated, the normal function of the controls have changed and the controls now support the search function. This indication is demonstrated by the connection between the GUI display of the normal search controls and the same type of display for the navigation controls, such as having the same type of highlighting for the search and navigation controls. Similarly, when the search routine ends, the UI module 215 can change the display to indicate that the navigation controls have returned to their normal function, such as by removing the highlighting from the controls.

Figure 4A:
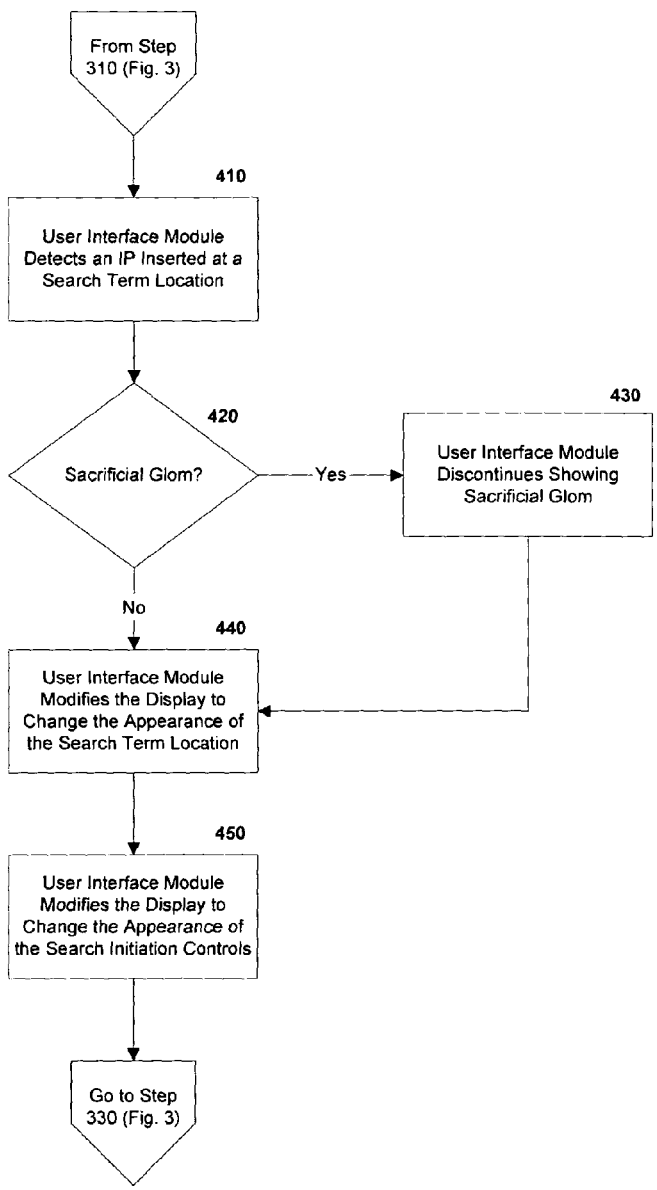
FIG. 4a is a flow diagram presenting a process for a user interface module changing the display of search controls in an electronic document in accordance with an exemplary embodiment of the present invention.

FIG. 4a is a flow diagram presenting a process 320 for a user interface module 215 changing the display of search controls in an electronic document 220 in accordance with an exemplary embodiment of the present invention. Referring to FIGS. 2, 3, and 4a, at step 410, the UI module 215 detects that an IP has been inserted at a search term location at step 310. At step 420, the UI module determines if the search term location has a sacrificial glom. For example, the glom may display the words "Type text to find," which indicates to the user where to enter the search term and disappears when an IP is placed at that location. If so, the UI module 215 may discontinue displaying the sacrificial glom, at step 430. Otherwise, the process 320 moves to step 440 and the UI module 215 modifies the display to change the appearance of the search term location, for example, a box that accepts text characters representing a search term.

At step 440, the change may comprise highlighting the search term location. This highlighting may include displaying the background of the search term entry location in a color that contrasts with the background color of the surrounding display area on the GUI. At step 450, the UI module 215 modifies the display to change the appearance of the search initiation control, for example, a button that a user may actuate to begin a search once a search term has been entered at the search term location. Similarly, this change may comprise highlighting the search initiation control. For example, the background of the search initiation control can be displayed in a color that contrasts with the background color of the surrounding display area on the GUI. In another example, the appearance of the control itself could be altered by changing the an image on the control, such as the text "Find." One skilled in the art would appreciate that the display may be changed in other ways to indicate that a search term has been entered at the search term location. Following step 450, the process 320 continues on to step 330.

One skilled in the art would appreciate that, even though steps 310 and 320 and steps 410 through 450 are presented as a series of events, all of these steps may occur simultaneously when a pointing device 265 or stylus 255 places an insertion point (IP) at the search term entry location.

Figure 4B:
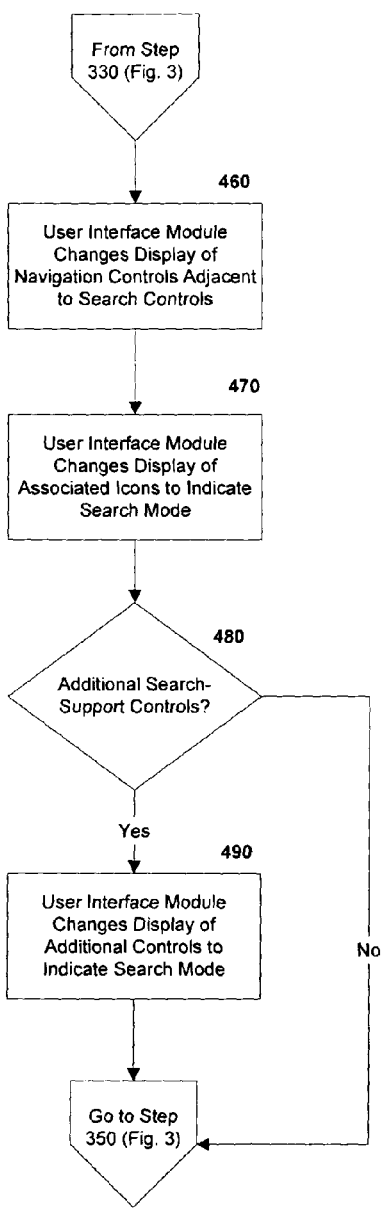
FIG. 4b is a flow diagram presenting a process for a user interface module changing the display of navigation controls in an electronic document in accordance with an exemplary embodiment of the present invention.

FIG. 4b is a flow diagram presenting a process 320 for a user interface module 215 changing the display of navigation controls in an electronic document 220 in accordance with an exemplary embodiment of the present invention. Referring to FIGS. 2, 3, 4a, and 4b, at step 460, the UI module 215 changes the display of any navigation controls adjacent to the search controls changed at steps 440 and 450. The change may comprise highlighting the navigation controls. For example, the background of the navigation controls can be displayed in a color that contrasts with the background color of the surrounding display area on the GUI and may be the same as the highlighting of the search controls. One skilled in the art would appreciate that highlighting the display is just one way that a GUI may distinguish controls used for conducting a search or navigating search results from other near-by controls on the display. Alternative ways of distinguishing the controls may include changing the shape or color of the controls.

At step 470, the UI module 215 changes the depiction of one or more icons associated with the navigation controls. For example, the navigation controls may have an icon, such as a depiction of a page of text in a word processor, associated with the controls. This icon typically indicates to a user the function of the controls. At step 470, this icon may be changed to indicate the new function of the controls, such as by changing the icon to a magnifying glass to indicate that the controls support a search function.

At step 480, the UI module 215 determines if any other search support controls are present on the GUI display adjacent to the search controls. The UI module 215 may display additional controls adjacent to the navigation controls, such as a display collapse control. The display collapse control, in response to a user actuating it with a pointing device 265, a stylus 255, or other input device, such as a key or keys on a keyboard 260, may cause the UI module 215 to change the display image by hiding certain controls that were visible prior to actuating the collapse control. If present, the process 340 moves to step 490 and the display is changed with respect to these controls. These controls may include a chevron symbol control used to collapse or expand the display of other controls. The change may comprise highlighting the navigation controls. For example, the background of the additional controls can be displayed in a color that contrasts with the background color of the surrounding display area on the GUI and may be the same as the highlighting of the search and navigation controls. If no additional controls are present, or after step 490, the process 340 continues to step 350 of process 300.

Figure 5:
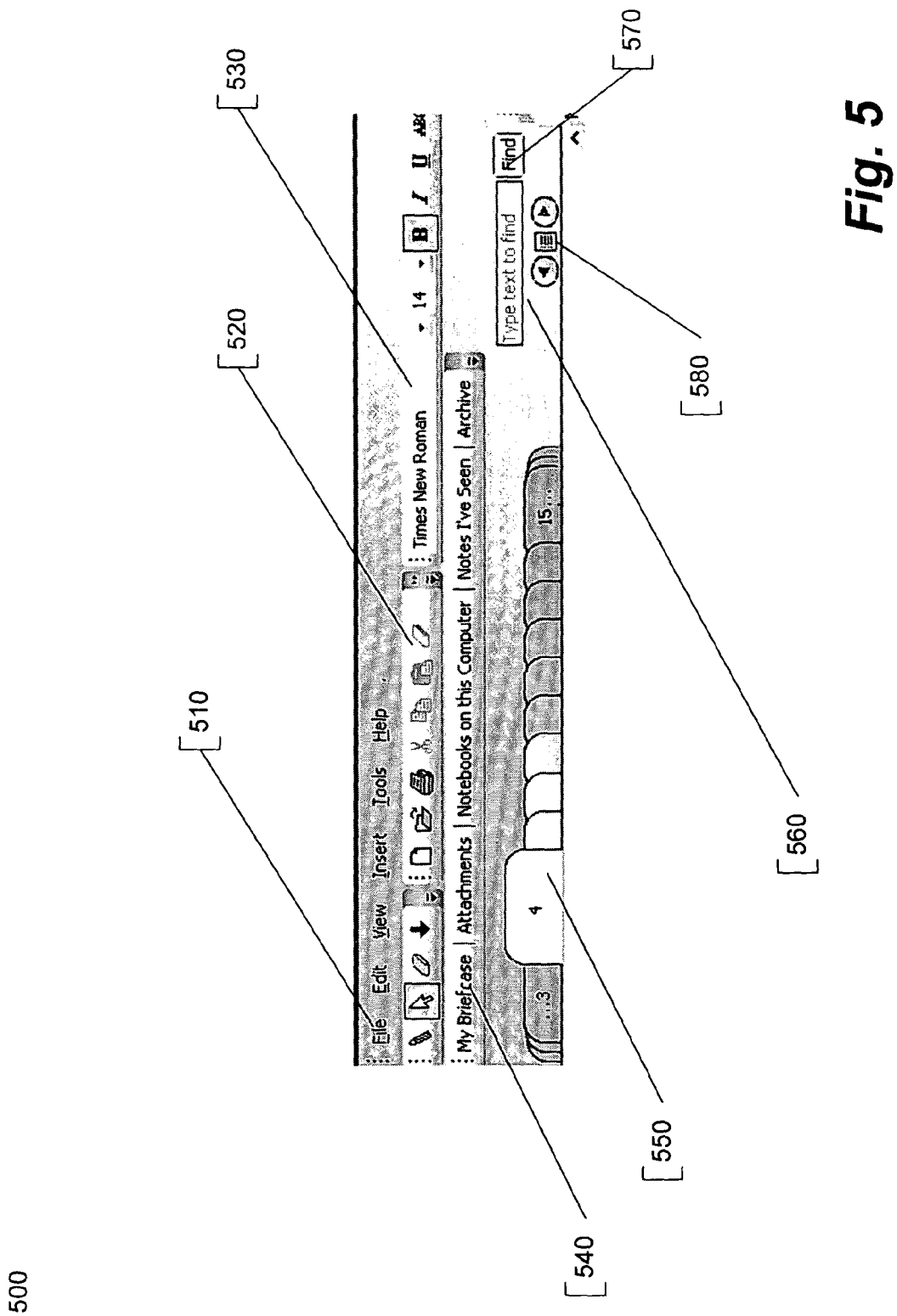
FIG. 5 is a display image depicting navigation and search controls for an electronic document editor in relationship to other controls for the electronic document editor in accordance with an exemplary embodiment of the present invention.

FIG. 5 is a display image 500 depicting navigation and search controls for an electronic document editor 114 (FIG. 1) in relationship to other controls for the electronic document editor 114 (FIG. 1) in accordance with an exemplary embodiment of the present invention. Referring to FIGS. 2 and 5, the UI module 215 may present a variety of controls to facilitate a user providing input information to and receiving output information from an electronic document 220. These controls typically include drop-down menus, such as "File" menu 510, toolbars 520, 530, 540, document tabs, such as a document tab 550, a search entry box 560, a search initiation control 570, and a navigation control 580. The navigation control 580 is located adjacent to the search controls 560, 570. The toolbars 520, 530, 540 typically contain controls that allow a user to print the electronic document 220, format text characters in the electronic document 220, or move among different electronic documents 220.

Figure 6:
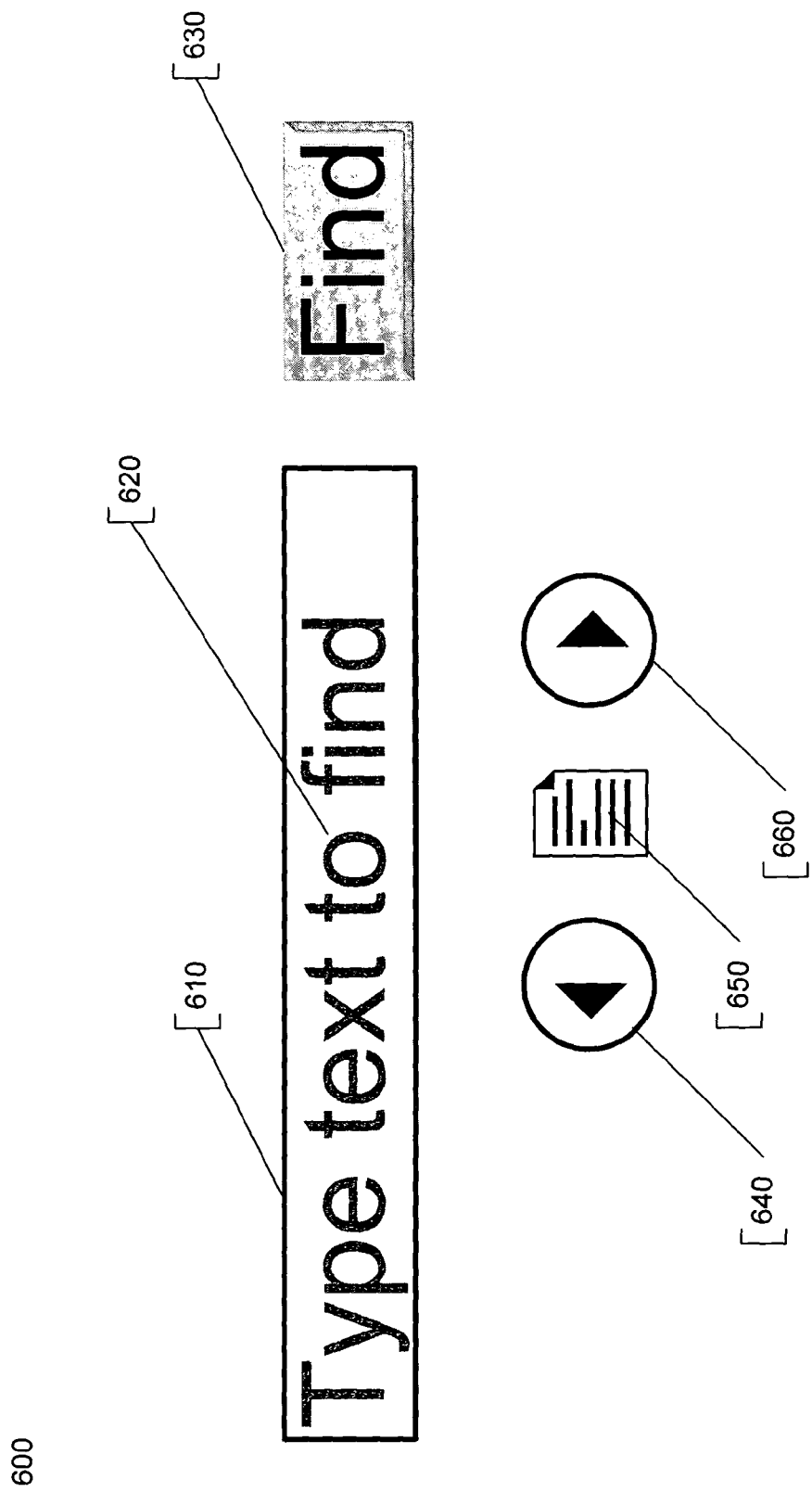
FIG. 6 is a display image depicting navigation and search controls for an electronic document editor in accordance with an exemplary embodiment of the present invention.

FIG. 6 is a display image 600 depicting navigation and search controls for an electronic document editor 114 (FIG. 1) prior to the initiation of a search in accordance with an exemplary embodiment of the present invention. Referring to FIGS. 2 and 6, the exemplary UI module 215 provides a box 610 for entering alphanumeric characters that comprise a search term. The box 610 may contain a sacrificial glom 620, such as one that contains the characters "Type text to find," to indicate to a user where to insert the insertion point to enter a search term. The UI module 215 also provides a search initiation control 630. The user may initiate a search after a search term has been entered into box 610 by actuating a control button 630 with a pointing device 265, stylus 255, or other input device. The search initiation control 630 may have text associated with it to indicate its function, such as the word "Find." Navigation controls are positioned adjacent to the search box 610 and search initiation control 630. These controls include buttons 640, 660 for changing the display of content in a specific direction in an electronic document 220. The navigation controls also include an icon 650 indicating the current function of the navigation buttons 640, 660, such as an icon depicting a page of text to indicate that the navigation controls changes the display to content on the next or previous page in the electronic document 220.

Figure 7:
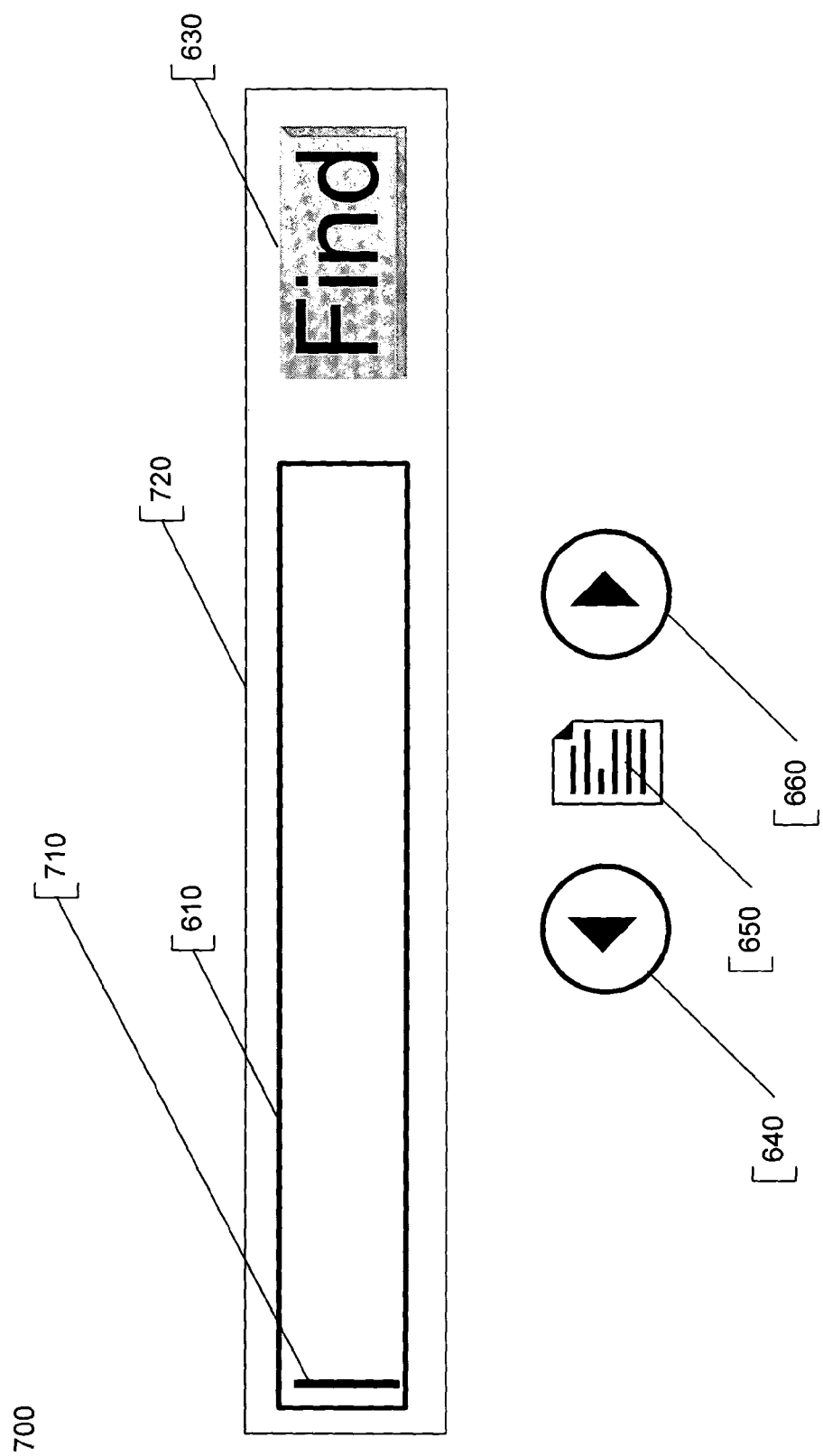
FIG. 7 is a display image depicting the use of search controls for an electronic document editor in accordance with an exemplary embodiment of the present invention.

FIG. 7 is a display image 700 depicting the response of the GUI when a search of an electronic document 220 is conducted in accordance with an exemplary embodiment of the present invention. Referring to FIGS. 2, 6, and 7, the search procedure is initiated when a user places an insertion point 710 into the search box 610, for example with a pointing device 265, a stylus 255, or other input device, such as a key or keys on a keyboard 260. The sacrificial glom 620 may disappear when the insertion point 710 is placed in the search box 610. The exemplary UI module 215, in response to the initiation of the search procedure, highlights the search box 610 and search initiation control 630. In other words, the UI module 215 may change the color of the background behind the search box 610 and search initiation control 630 to contrast with the background of a display area adjacent to the search box 610 and search initiation control 630. At this point in the search procedure, the UI module 215 may not change the appearance of the navigation controls, including buttons 640, 660 and icon 650.

Figure 8:
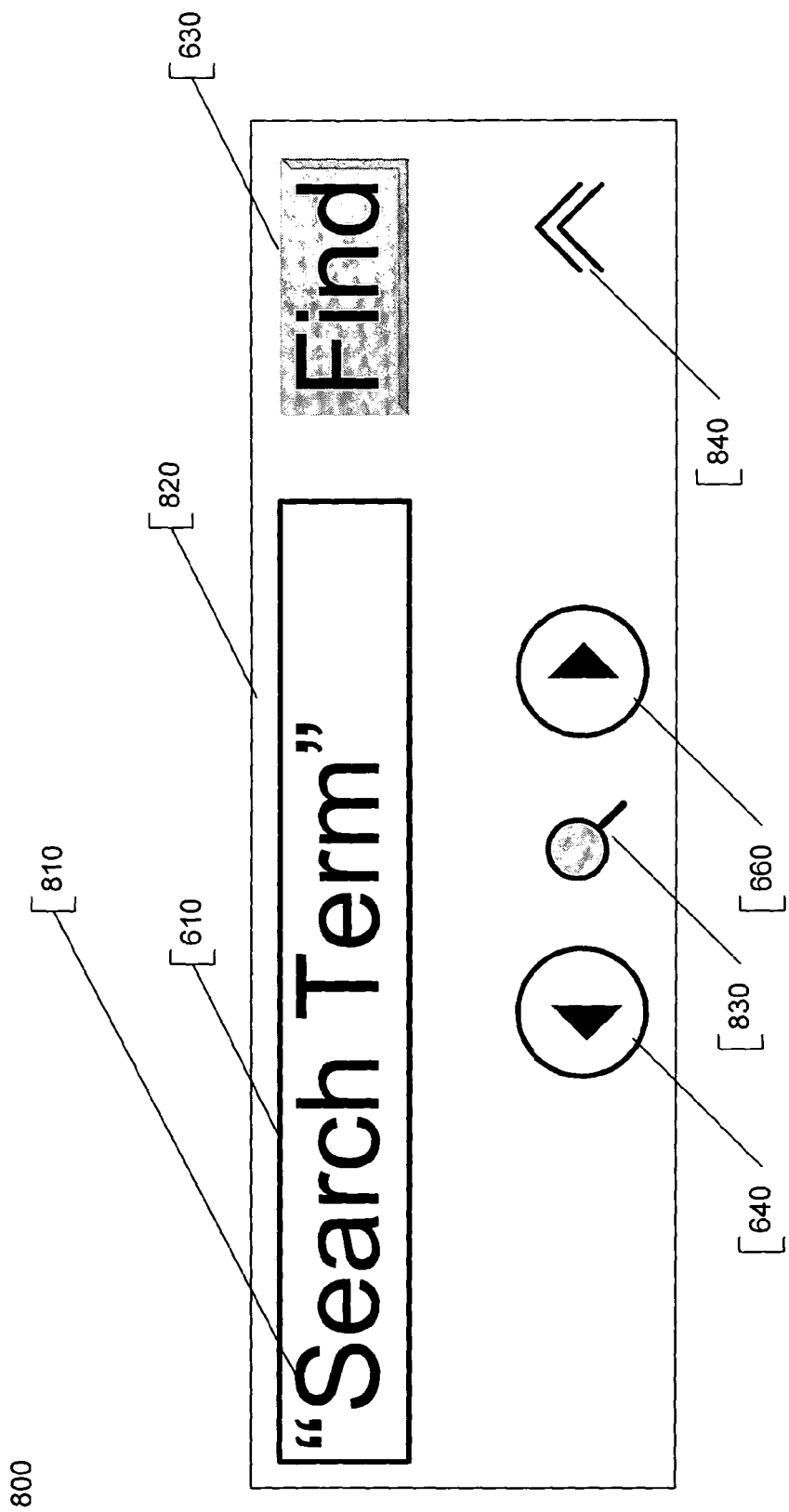
FIG. 8 is a display image depicting a GUI affecting the display image of navigation and search controls for an electronic document editor when a search is being performed in accordance with an exemplary embodiment of the present invention.

FIG. 8 is a display image 800 depicting a GUI affecting the display image of navigation and search controls when a search is being performed in accordance with an exemplary embodiment of the present invention. Referring to FIGS. 2 and 8, following a user entering the search term 810 into the search box 610 and actuating the search initiation control 630, the exemplary UI module 215 changes the display such that a highlighted region of the display 820 encompasses the search box 610, search initiating control 630 and navigation controls, such as buttons 640, 660 and an icon 830. The UI module 215 may change the icon 830 to indicate the current function of the navigation control buttons 640, 660. For example, the icon 830 may be a magnifying glass, to indicate to a user that the navigation control buttons 640, 660 correspond to a search function.

Additionally, the UI module 215 may display a collapse control, such as a chevron control 840. The chevron control 840 may have the points of the chevron pointing upward, to indicate to a user that the navigation control buttons 640, 660 could be hidden.

Figure 9:
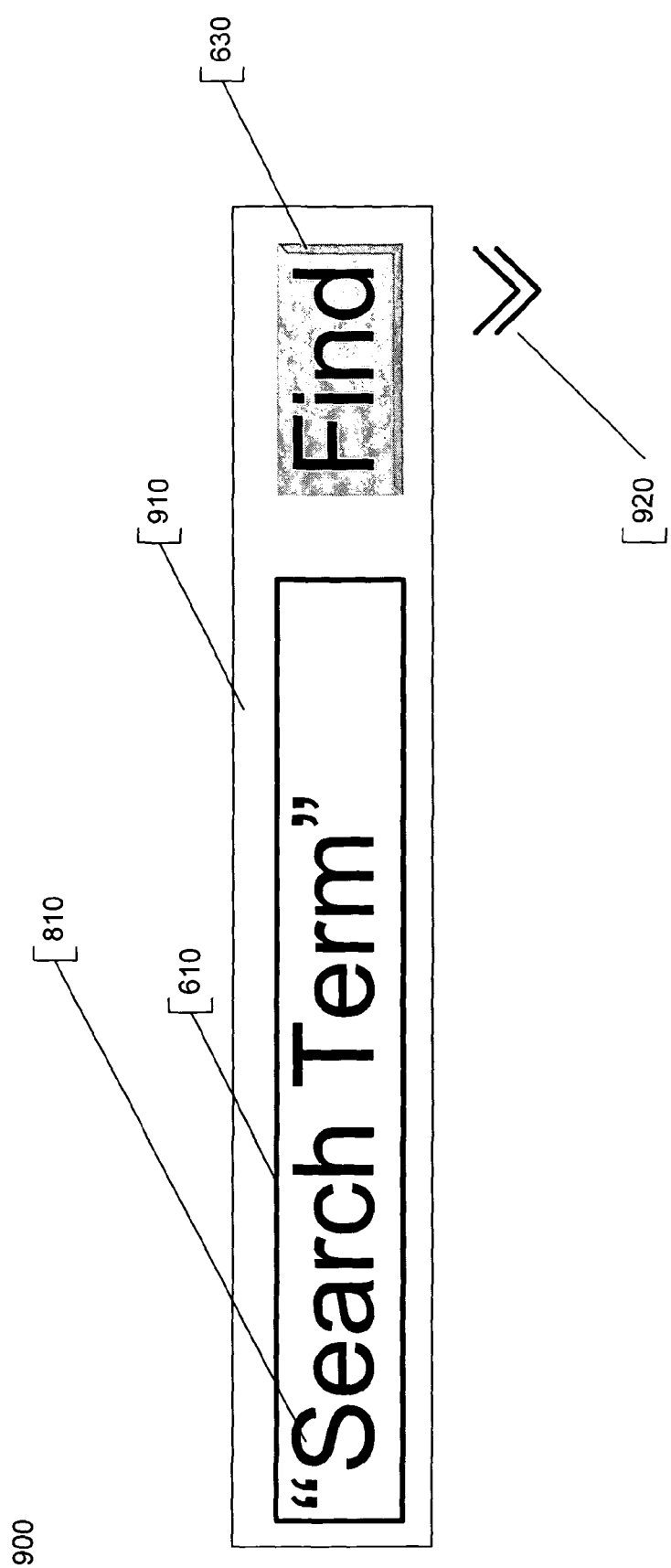
FIG. 9 is a display image depicting an alternative display of an GUI affecting the display image of navigation and search controls for an electronic document editor when a search is being performed in accordance with an exemplary embodiment of the present invention.

FIG. 9 is a display image 900 depicting an alternative display of a GUI affecting the display image of navigation and search controls when a search is being performed in accordance with an exemplary embodiment of the present invention. Referring to FIGS. 2, 8, and 9, image 900 depicts a change in the display image as compared to display image

800. This change may be in response to a user actuating the chevron collapse control 840. The exemplary UI module 215 typically hides navigation control buttons 640, 660 and icon 830 in response to actuating the chevron collapse control 840. Similarly, the highlight region 910 may shrink to encompass the search box 610 and search initiation control 630. Additionally, the UI module 215 may rotate the chevron collapse control 840 to form control 920 such that the points of the chevron point down, indicating to a user that controls are currently being hidden but could be revealed by actuating control 920.

One skilled in the art would appreciate that the present invention supports a method for a GUI to change a display to indicate that navigation controls can be used for navigating through results of a search conducted in an electronic document. A GUI may highlight the GUI control that accepts text characters for indicating a search term such that the area contrasts with the display of an adjacent display area in response to entering the search term. Once the search is initiated, such as by actuating a search initiation control, the GUI may change to highlight navigation controls to indicate that those controls can be used to navigate between search result hits. Additional icons or controls may be displayed to further indicate the function of navigation controls and actions that may be taken to further modify the display of controls, such as collapsing some of the controls.

What is claimed is:

1. A computer-implemented method for changing a first function of one or more navigation controls on a user interface to a second function, wherein the one or more navigation controls are located adjacent to one or more search controls, comprising the steps of:
   changing a display image of the one or more search controls on the user interface in response to receiving a search term into a search term location;
   assigning the second function to the one or more navigation controls while simultaneously discontinuing the first function of the one or more navigation controls, wherein the second function comprises navigating between successive hits resulting from a search executed on the received search term, wherein the second function comprises causing the user interface to display at least one of a preceding and a succeeding page of content in an electronic document;
   changing a display image of the one or more navigation controls on the user interface in response to the assigning of the second function to the one or more navigation controls; and
   changing the depiction of at least one icon associated with the one or more navigation controls by replacing a first depiction associated with a search result to a second depiction indicating that the one or more navigation controls currently support the second function, the second depiction corresponding to a function for performing, in the electronic document the search.

2. The method of claim 1 wherein the step of changing the display image of one or more search controls on the user interface comprises changing the color of the background of the display image of the one or more search controls.

3. The method of claim 1 wherein an electronic document editor comprises the search term location and the second function of the one or more navigation controls comprises changing the user interface to show a portion of an electronic document that contains a result of a user-initiated search using the electronic document editor.

4. The method of claim 1 comprising the additional step of reassigning the first function to the one or more navigation controls while simultaneously discontinuing the second function of the one or more navigation controls in response to ending a user-initiated search.

5. The method of claim 1 comprising the additional step of changing a display image of one or more additional controls on the user interface in response to changing the display of the one or more navigation controls, wherein the one or more additional controls are located adjacent to the one or more navigation controls.

6. The method of claim 5 wherein the one or more additional controls comprise a control that discontinues displaying the one or more navigation controls on the user interface.

7. A computer-implemented method for changing the display of one or more navigation controls on a user interface of an electronic document editor, comprising the steps of:
   changing a display image of the one or more navigation controls on the user interface in response to receiving a search term into a search term location of an electronic document editor, wherein changing the display image of the one or more navigation controls on the user interface comprises changing the color of the background of the display image of one or more search controls;
   assigning a second function to the one or more navigation controls while simultaneously discontinuing a first function of the one or more navigation controls, wherein the second function comprises navigating between successive hits resulting from a search executed on the received search term, wherein the second function comprises causing the user interface to display at least one of a preceding and a succeeding page of content in an electronic document;
   changing a display image of the one or more navigation controls on the user interface in response to conducting a search of the search term with the electronic document editor, wherein the display image of the one or more navigation controls is displayed on the user interface adjacent to the display image of one or more search controls; and
   changing the depiction of at least one icon associated with the one or more navigation controls by replacing a first depiction associated with a search result to a second depiction indicating that the one or more navigation controls currently support the second function, the second depiction corresponding to a function for performing, in the electronic document the search.

8. The method of claim 7 wherein the second function of the one or more navigation controls comprises changing a display to show a portion of the electronic document that contains a result of the search.

9. The method of claim 7 comprising the additional step of reassigning the first function to the one or more navigation controls while simultaneously discontinuing the second function of the one or more navigation controls in response to ending the search.

10. The method of claim 7 comprising the additional step of changing a display image of one or more additional controls on the user interface in response to changing the display of the one or more navigation controls, wherein the one or more additional controls are located adjacent to the one or more navigation controls.

11. The method of claim 10 wherein the one or more additional controls comprise a control that discontinues displaying the one or more navigation controls on the user interface.

12. A computer-readable storage device storing a set of computer-executable instructions implementing a method for changing a first function of one or more navigation controls on the user interface to a second function, wherein the one or more navigation controls are located adjacent to one or more search controls, comprising the steps of:

changing a display image of the one or more search controls on a user interface display in response to receiving a search term into a search term location of an electronic document editor;

assigning a second function to the one or more navigation controls while simultaneously discontinuing the first function of the one or more navigation controls, wherein the second function comprises navigating between successive hits resulting from a search executed on the received search term, wherein the second function comprises causing the user interface to display at least one of a preceding and a succeeding page of content in an electronic document;

changing a display image of the one or more navigation controls on the user interface in response to the assigning of the second function to the one or more navigation controls;

reassigning the first function to the one or more navigation controls while simultaneously discontinuing the second function of the one or more navigation controls in response to ending the user-initiated search; and changing the depiction of at least one icon associated with the one or more navigation controls by replacing a first depiction associated with a search result to a second depiction indicating that the one or more navigation controls currently support the second function, the second depiction corresponding to a function for performing, in the electronic document the search.

13. The computer-readable storage device of claim 12 wherein the step of changing the display image of one or more search controls on the user interface comprises changing the color of the background of the display image of one or more search controls.

14. The computer-readable storage device of claim 12 wherein the second function of the one or more navigation controls changing a display to show a portion of the electronic document that contains a result of the user-initiated search.

15. The computer-readable storage device of claim 12 comprising the additional step of changing a display image of one or more additional controls on the user interface in response to changing the display of the one or more navigation controls, wherein the one or more additional controls are located adjacent to the one or more navigation controls.

\* \* \* \* \*